United States Patent
Nolan et al.

(10) Patent No.: US 10,015,864 B2
(45) Date of Patent: Jul. 3, 2018

(54) LIGHTING PREFERENCE ARBITRATION

(71) Applicant: PHILIPS LIGHTING HOLDING B.V., Eindhoven (NL)

(72) Inventors: Julian Charles Nolan, Pully (CH); Matthew John Lawrenson, Bussigny-Pres-de-Lausanne (CH); Alexander Henricus Waltherus Van Eeuwijk, Eindhoven (NL); Hilbrand Vanden Wyngaert, Grobbendonk (BE); Huon Urbald Ogier Norbert Van De Laarschot, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/509,631

(22) PCT Filed: Aug. 5, 2015

(86) PCT No.: PCT/EP2015/068069
§ 371 (c)(1),
(2) Date: Mar. 8, 2017

(87) PCT Pub. No.: WO2016/037772
PCT Pub. Date: Mar. 17, 2016

(65) Prior Publication Data
US 2017/0265277 A1  Sep. 14, 2017

(30) Foreign Application Priority Data
Sep. 8, 2014  (EP) ..................................... 14183935

(51) Int. Cl.
*H05B 37/02* (2006.01)

(52) U.S. Cl.
CPC .............................. *H05B 37/0227* (2013.01)

(58) Field of Classification Search
CPC .................................................. H05B 37/0227
(Continued)

(56) References Cited

U.S. PATENT DOCUMENTS

| 9,655,193 B2 * | 5/2017 | Knaapen | H05B 33/0854 |
| 2012/0206050 A1 * | 8/2012 | Spero | B60Q 1/04 |
| | | | 315/152 |
| 2017/0231064 A1 * | 8/2017 | Lawrenson | H05B 37/0227 |

FOREIGN PATENT DOCUMENTS

| EP | 2645823 A1 | 2/2013 |
| WO | 2010079388 A1 | 7/2010 |

(Continued)

Primary Examiner — Dylan White
(74) Attorney, Agent, or Firm — Meenakshy Chakravorty

(57) ABSTRACT

A controller comprising: an output for controlling light source(s) arranged to emit light to illuminate an environment; and an input for receiving a signal output from at least one sensor. The controller is configured to: identify presence of a user and at least one further user based on the signal output from the sensor; determine lighting preferences of the users; detect an orientation of the users based on the signal from the sensor; estimate a field of view (FOV) of the users based on the detected orientation of the users; determine that at least one light source is positioned to emit light in both the FOVs of the users, arbitrate between the lighting preferences of the users to determine light settings to be applied to the at least one light source, and control said at least one light source based on the determined light settings.

15 Claims, 4 Drawing Sheets

(58) Field of Classification Search
USPC .......................................................... 315/153
See application file for complete search history.

(56) References Cited

FOREIGN PATENT DOCUMENTS

| WO | 2013111134 A1 | 8/2013 | |
|---|---|---|---|
| WO | WO 2013111134 A1 * | 8/2013 | ........... H05B 7/0218 |
| WO | WO 2014064587 A1 * | 5/2014 | ......... H05B 37/0227 |

* cited by examiner

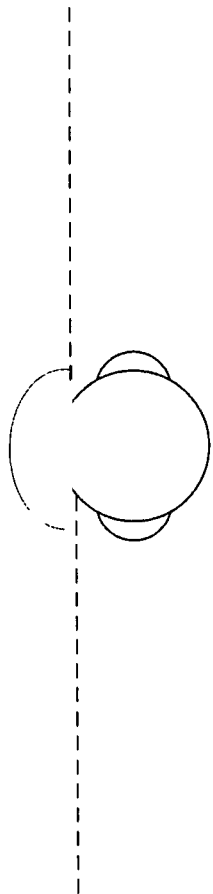
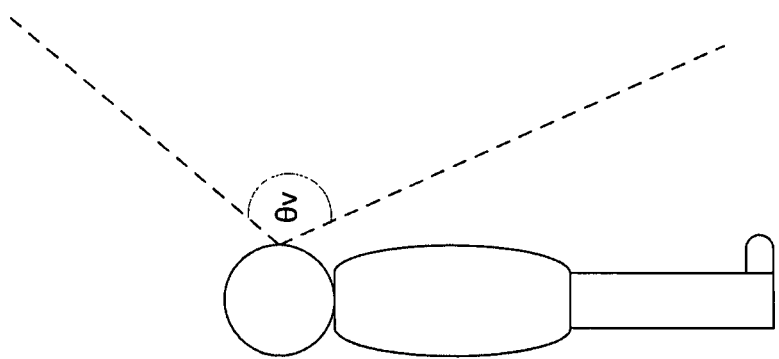

LIGHTING PREFERENCE ARBITRATION

CROSS-REFERENCE TO PRIOR APPLICATIONS

This application is the U.S. National Phase application under 35 U.S.C. § 371 of International Application No. PCT/EP2015/068069, filed on Aug. 5, 2015, which claims the benefit of European Patent Application No. 14183935.7, filed on Sep. 8, 2014. These applications are hereby incorporated by reference herein.

TECHNICAL FIELD

The present disclosure relates to the arbitration of lighting preferences of users to control light sources.

BACKGROUND

Digital lighting technologies, i.e. illumination based on semiconductor light sources, such as light-emitting diodes (LEDs), today offer a viable alternative to traditional fluorescent, High-intensity discharge (HID), and incandescent lamps. Recent advances in LED technology coupled with its many functional advantages such as high energy conversion and optical efficiency, durability, and lower operating costs, has led to the development of efficient and robust full-spectrum light sources that enable a variety of lighting effects.

Lighting systems have been disclosed wherein a person can input his or her lighting preferences, and a central controller can control LEDs or other light sources to implement the person's lighting preferences.

Furthermore when multiple persons are present at a location it is known to determine lighting settings based on taking into account the lighting preferences of the multiple persons (e.g. arbitration). For example if a first user prefers brightness levels A-C and a second user prefers brightness levels B-D; when both users are present in the same space the brightness level can be controlled within the bounds of brightness levels B-C.

SUMMARY

The inventors have recognized that in known solutions arbitration based on a user's dynamically changing orientation is not considered, meaning that their directional Field of View (FOV) is not considered.

Embodiments of the present disclosure relate to (1) applying a user's lighting preferences to an environment, based on what the user sees in this environment (i.e. his/her field of view); and (2) applying the user's lighting preferences to the environment based on where other users are in this environment and what these other users see.

According to one aspect of the present disclosure there is provided a controller comprising: an output for controlling one or more light source arranged to emit light to illuminate an environment; and an input for receiving a signal output from at least one sensor; wherein the controller is configured to: identify presence of a user and at least one further user in said environment based on the signal output from the at least one sensor; determine lighting preferences of the user and the at least one further user; detect an orientation of the user and the at least one further user based on the signal output from the at least one sensor; estimate a field of view of the user and the at least one further user based on the detected orientation of the user and the at least one further user; determine that at least one light source of the one or more light source is positioned to emit light in both the field of view of said user and the field of view of said at least one further user, arbitrate between the lighting preferences of the user and the at least one further user to determine light settings to be applied to the at least light source, and control said at least one light source based on the determined light settings.

In an exemplary embodiment, the controller is configured to perform said arbitration based on a comparison of a proportion of the field of view of the user in which the light emitted from the at least one light source is incident, and a proportion of the field of view of the at least one further user in which the light emitted from the at least one light source is incident; and the determined light settings are based (to a greater extent) on (i) the lighting preferences of the user if the proportion of the field of view of the user is greater than proportion of the field of view of the at least one further user, or (ii) the lighting preferences of the at least one further user if the proportion of the field of view of the at least one further user is greater than proportion of the field of view of the user.

In another exemplary embodiment, the controller is configured to perform said arbitration based on a comparison of a location in the field of view of the user at which the light emitted from the at least one light source is incident, and a location in the field of view of the at least one further user at which the light emitted from the at least one light source incident; and the determined light settings are (to a greater extent) based on (i) the lighting preferences of the user if the light emitted from the light source is incident in the field of view of the user in a more central location than in the field of view of the at least one further user, or (ii) the lighting preferences of the least one further user if the light emitted from the light source is incident in the field of view of the least one further user in a more central location than in the field of view of the user.

In an exemplary embodiment, the light settings to be applied to the at least one light source are determined based on the lighting preferences of the user and the at least one further user. The light settings to be applied to the at least one light source may be determined based on an average of the lighting preferences of the user and the at least one further user. As a further example, the light settings to be applied to the at least one light source may be determined based on the outcome of an arbitration algorithm. Such an arbitration algorithm can determine, for example, matching preferences (e.g. there are two users, each of them prefers a dim level of 40%; as such this is the dim level that is set), overlapping preference ranges (e.g. there are three users, the first user prefers a dim level between 30% and 60%, the second user prefers a dim level between 40% and 80%, and the third user prefers a dim level between 50% and a 100%; as such a dim level is selected within the overlapping range of 50% to 60% —the selection of the dim level within this range can be based on the average dim level preference over all three users) or the algorithm can mediate between divergent preferences (e.g. a first user prefers a dim level between 20%-50% and a second user prefers a dim level between 70% and 100%; the dim level that is set is halfway between the upper bound of the first user and the lower bound of the second user), request user feedback to solve differences between preferences (e.g. request users to adapt their preferences), prioritize user preferences based on ranking (e.g. a user that is in his home location has preferences over a user that is a guest at that location), etc.

The controller may further comprise an input for receiving location information of the one or more light source from a memory, wherein the controller is configured to determine that said at least one light source is positioned to emit light in both the field of view of said user and the field of view of said at least one further user based on said location information.

The controller may be configured to determine said light settings based on properties of the at least one light source.

The properties of the at least one light source may comprise one or any combination of: a light source type of the at least one light source, an available color range of light emitted from the at least one light source, an available brightness range of light emitted from the at least one light source, and an available beam spread range of light output from the at least one light source.

The controller may be further configured to control said at least one light source of the one or more light source by transmitting said determined light settings to a lighting controller, the lighting controller configured to control said at least one light source based on received light settings.

The controller may be configured to: capture biometric information of the user based on the signal output from the at least one sensor, and determine if the captured biometric information corresponds to biometric information stored in a memory coupled to the controller; wherein if the captured biometric information corresponds to biometric information stored in said memory, the controller further configured to retrieve lighting preferences associated with the biometric information stored in said memory to determine lighting preferences of the user;

wherein if the captured biometric information does not correspond to biometric information stored in said memory, the controller further configured to retrieve default lighting preferences stored in said memory to determine lighting preferences of the user.

The controller may be configured to: capture biometric information of the at least one further user based on the signal output from the at least one sensor, and determine if the captured biometric information corresponds to biometric information stored in a memory coupled to the controller; wherein if the captured biometric information corresponds to biometric information stored in said memory, the controller further configured to retrieve lighting preferences associated with the biometric information stored in said memory to determine lighting preferences of the at least one further user; wherein if the captured biometric information does not correspond to biometric information stored in said memory, the controller further configured to retrieve default lighting preferences stored in said memory to determine lighting preferences of the at least one further user.

The lighting preferences of the user may comprise one or any combination of the user's preferred lighting brightness, lighting color, spread of light incident in the user's FOV, and light source type; and the lighting preferences of the at least one further user may comprise one or any combination of the at least one further user's preferred lighting brightness, lighting color, spread of light incident in the at least one further user's field of view, and light source type.

The controller may be configured to execute an image recognition algorithm to detect an orientation of the user's head to detect the orientation of the user and to detect an orientation of the least one further user's head to detect the orientation of the least one further user.

The controller may be configured to control said at least one light source of the one or more light source to emit light to illuminate said area of the environment based on an average of determined lighting preferences of the user and the at least one further user.

The controller may be further configured to: determine that an area of the environment is present in only the field of view of said user; and determine that at least one light source of the one or more light source is positioned to emit light to illuminate the area of the environment that is present in only the field of view of said user, and control said at least one light source of the one or more light source to emit light to illuminate said area of the environment that is present in only the field of view of said user based on only the determined lighting preferences of said user.

The controller may be further configured to: determine that an area of the environment is present in only the field of view of the at least one further user; and determine that at least one light source of the one or more light source is positioned to emit light to illuminate the area of the environment that is present in only the field of view of said at least one further user, and control said at least one light source of the one or more light source to emit light to illuminate said area of the environment that is present in only the field of view of said at least one further user based on only the determined lighting preferences of said at least one further user.

According to another aspect of the present disclosure there is provided a lighting system comprising: the controller referred to above, the at least one sensor; and the one or more light source.

The at least one sensor may comprise one or any combination of a time of flight sensor and a structured light sensor.

According to a further aspect, there is provided a computer program product for performing sensing using a signal output from at least one sensor to control one or more lighting source (106) to illuminate an environment, the computer program product comprising code embodied on a computer-readable medium and configured so as when executed on one or more processing units to perform operations of: identifying presence of a user and at least one further user in said environment based on the signal output from the at least one sensor; determining lighting preferences of the user and the at least one further user; detecting an orientation of the user and the at least one further user based on the signal output from the at least one sensor; estimating a field of view of the user and the at least one further user based on the detected orientation of the user and the at least one further user; determine that at least one light source of the one or more light source is positioned to emit light in both the field of view of said user and the field of view of said at least one further user, arbitrate between the lighting preferences of the user and the at least one further user to determine light settings to be applied to the at least one light source, and control said at least one light source based on the determined light settings.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which:

FIG. 3a illustrates a forward facing vertical view angle of a user's field of view;

FIG. 3b illustrates a forward facing horizontal view angle of a user's field of view.

DETAILED DESCRIPTION

Figure 1:
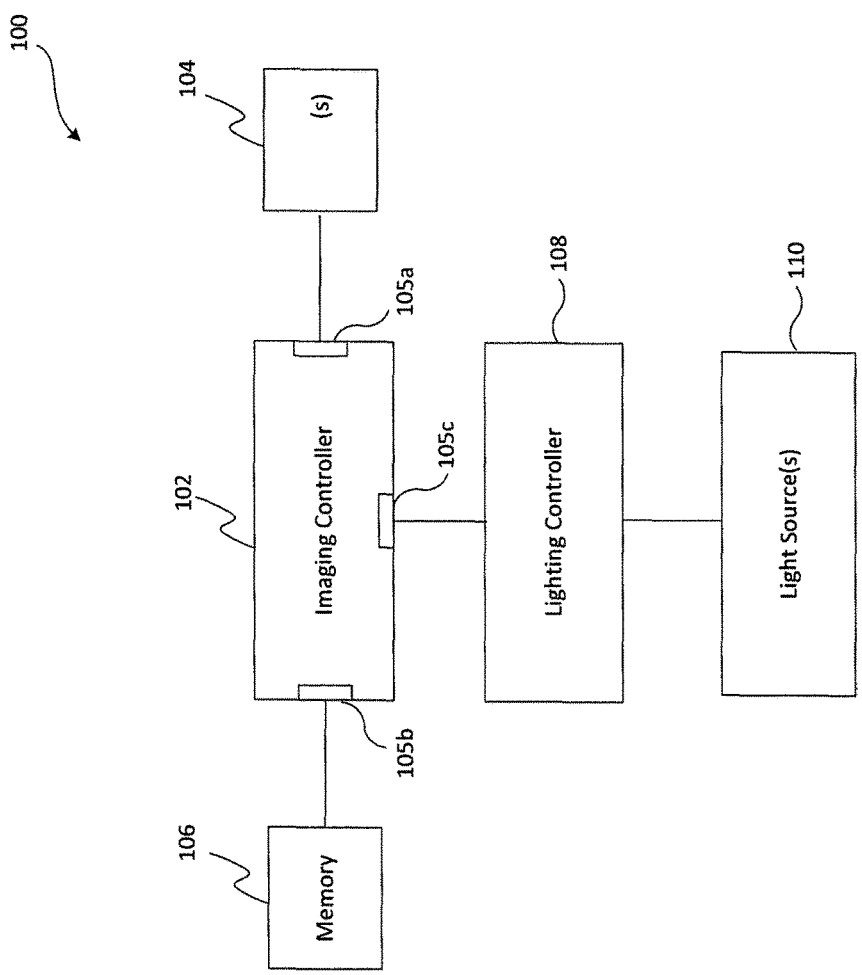
FIG. 1 is a schematic block diagram of a lighting system.

Reference is first made to FIG. 1 which illustrates a schematic block diagram of a lighting system 100.

The lighting system 100 comprises an imaging controller 102 coupled to at least one sensor 104 and a memory 106.

The imaging controller 102 comprises an input 105a for receiving a signal output from the sensor(s) 104. The sensor(s) 104 may comprise a time of flight sensor comprising a time-of-flight sensing element. The time-of-flight sensing element is able to sense radiation emitted from an emitter, and this sensing is synchronized with the emission of the radiation from the emitter. The emitter may be a dedicated emitter which may be part of the time of flight sensor. In this case the emitted radiation may be radiation other than visible light, e.g. infrared, RF or ultrasound, in order not to intrude upon or be confused with the visible light in the environment of the lighting system 100; or the radiation could be visible light modulated with an identifiable signal to distinguish it from the rest of the light in the environment of the lighting system 100.

Some of the emitted radiation will be reflected from an object back towards the time of flight sensor. As it is synchronized with the emission, the time of flight sensor can be used to determine the amount of time between emission from the emitter and reception back at the sensing element, i.e. time-of-flight information. Further, the sensing element takes the form of a two-dimensional pixel array, and is able to associate a time-of-flight measurement with a measurement of the radiation captured by some or all of the individual pixels. Thus the time-of-flight sensor is operable to capture a depth-aware or three-dimensional image in its SR, including a detected object. In the case where the sensing element captures visible light, the time-of-flight sensor may also be referred to as a depth-aware or 3D camera. By applying image recognition to the depth-aware or 3D images captured by the time of flight sensor, it is possible to detect information such as the location of a detected person in the environment of the lighting system 100, and the direction in which the person is facing i.e. the persons orientation. Details of time-of-flight based image sensing in themselves will be familiar to a person skilled in the art, and are not described in any further detail herein.

Alternatively or additionally the sensor(s) 104 may comprise a structured light sensor. Structured lighting is a well-known technique for use in extraction of 3D information from a scene. The extraction of 3D information is based on the projection of a known lighting pattern on a scene, and capturing of the resulting image with a sensor (camera) of the scene. The technique works on the basis of disparity with a distance (often called the baseline) between the camera and a projector that projects the lighting pattern. As a result of this disparity, the depth of an object (seen from the camera) can be determined.

The sensor(s) 104 may comprises wearable or other sensors local to the user—such as a smartwatch, glasses etc. For example, wearable technology such Google Glasses can be used to determine the orientation of a user's head, and a smartwatch which will usually be worn on a user's wrist, can be used to determine the orientation of the user's head given that a smartwatch will typically have a defined relationship with the orientation of the users head.

The imaging controller 102 is coupled to a lighting controller 108. The imaging controller 102 may be coupled to the lighting controller 108 via a wired connection over a wired network or a wireless connection over a wireless network. For example, the imaging controller 102 may be coupled to the lighting controller 108 via an I²C bus, a DMX bus, a DALI bus, Ethernet connection Wi-Fi connection or ZigBee connection. As will be described in more detail below, the imaging controller 102 is configured to determine light settings based on signals output from the sensor(s) 104 and supply these to the lighting controller 108 via an interface 105c of the imaging controller 102.

The lighting controller 108 is coupled to one or more light source 110 that are operable to emit light to illuminate an environment of the lighting system 100. The environment may be any indoor or outdoor space. A light source may be mounted on the ceiling of an indoor space, a wall, floor or ground, or may be disposed elsewhere such as in a free-standing unit.

In response to receiving light settings from the imaging controller 102, the lighting controller 108 is configured to transmit appropriate control signals to the light source(s) 110 to apply the light settings to the light source(s) 110. That is, the lighting controller 108 responds to instructions received from the imaging controller 102 in order to control the light source(s) 110.

A light source may comprise any suitable source of light such as e.g. a laser diode, an LED, an incandescent source (e.g., filament lamp, halogen lamp), fluorescent source, and phosphorescent source. The term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like.

The functionality of the imaging controller 102 will now be described in more detail below with reference to FIG. 2 which illustrates a process 200 implemented by the imaging controller 102 for controlling the light emitted from the light source(s) 110.

Figure 2:
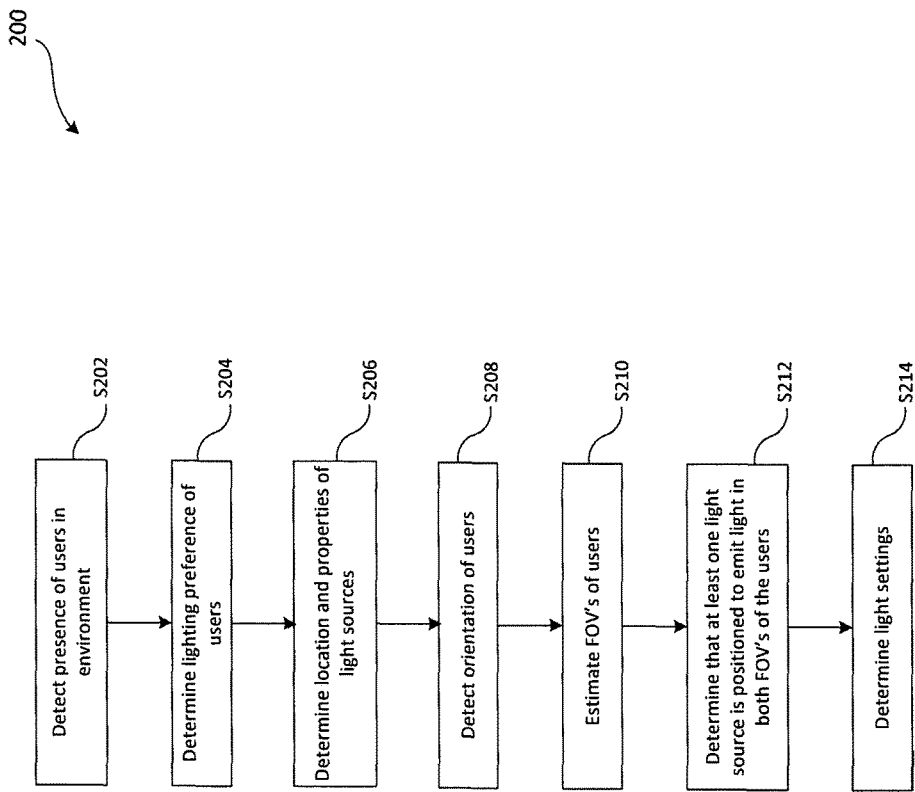
FIG. 2 is a flow chart of a method to control lighting devices of the lighting system.

For simplicity FIG. 2 is described with reference to a scenario where two users (a first user and a second user) are present in the environment of the lighting system 100

The functionality of the imaging controller 102 may be implemented in code (software) stored on a memory comprising one or more storage media, and arranged for execution on a processor comprising on or more processing units. The code is configured so as when fetched from the memory and executed on the processor to perform operations in line with embodiments discussed below. Alternatively it is not excluded that some or all of the functionality of the imaging controller 102 is implemented in dedicated hardware circuitry, or configurable hardware circuitry like a field-programmable gate array (FPGA).

At step S202, the imaging controller 102 detects the presence of the first user and the second user in the environment of the lighting system 100 based on the signal received via interface 105a from the sensor(s) 104. Step 5202 may be implemented by means of the imaging controller 102 executing a facial recognition algorithm to analyses images captured by the sensor(s) 104 to detect one or more facial feature of the first user and the second user. It is common for such facial recognition algorithms to detect the presence of a user based on detecting a user's nose, based on its central position within the face, the fact that it is likely to not be obscured, and its relative ease of detection using both amplitude and depth based approaches.

At step S204, the imaging controller 102 determines lighting preferences of the first user and the second user present in the environment of the lighting system 100

As shown in FIG. 1, the imaging controller 102 is coupled to a memory 106 (e.g. a database or other storage medium) via an interface 105b, The imaging controller 102 may be coupled to the memory 106 via a wired or wireless connection. The memory 106 stores characteristics of known users in association with lighting preferences of the known users.

The characteristics of known users may comprise biometric information. By way of example only, and without limitation, the biometric information may comprise one or more of facial measurement data (e.g. distances between the eyes, nose and mouth of a consumer) other body measurement data, and iris pattern data.

If a user is a known user, the imaging controller 102 is able to determine lighting preferences of the known user at step S204 by comparing biometric information extracted from images captured by sensor(s) 104 with the stored biometric associated with the known user, and retrieving lighting preferences associated with the stored biometric information which matches the biometric information extracted from the images captured by sensor(s) 104 via the interface 105b.

The known user information may be collected as part of a registration process which a user carries out. The registration process collects data associated with a user (for example biometric information of the user) and lighting preferences of the user. The imaging controller is configured to determine biometric information of a user based on the signal received from the sensor(s) 104 and store the determined biometric information in the memory 106. A user may load their lighting preferences into the memory 106 using an input device e.g. keyboard mouse, touch screen, microphone etc. The input device may be coupled to the imaging controller 102 via a wired or wireless connection in which case the imaging controller 102 is configured, in response to receiving a user's lighting preferences to store the received lighting preferences in the memory 106. Alternatively, the input device may be coupled to the memory 106 via a wired or wireless connection in which case lighting preferences may be loaded directly into memory 106. Following the registration process a user becomes a "known" user.

Lighting preferences of a known user may include for example, the user's preferred lighting brightness, lighting color, light source type (e.g. preference for incandescent lighting over fluorescent lighting), and spread of light incident in the user's FOV.

The imaging controller 102 may determine that a user is an "unknown" user based on determining that biometric information of the user extracted from images captured by sensor(s) 104 does not match any of the biometric associated with known users stored in the memory 106. In these scenarios, the imaging controller 102 is configured to associate an unknown user with predetermined lighting preferences (e.g. default lighting preferences). These predetermined lighting preferences may be stored in memory 106.

At step S206, the imaging controller 102 determines the location of light source(s) 110 in the environment of the lighting system 100 and their properties.

At step S206 the imaging controller 102 determines the location and properties of each light source of the light source(s) 110 that is controllable by the lighting controller 108. It will be appreciated that all of the light source(s) 110 may be controllable by the lighting controller 108, however in other embodiments one or more light source may not be controllable by the lighting controller 108. The properties of a light source may include the light source type, the available range of color of light emitted from the light source, the available range of brightness of light emitted from the light source, the available beam spread range of light output by the light source (defined by a beam angle or beam angle range) etc. The information on the location and the properties of the light source(s) 110 may be stored in memory 106 and retrieved by the imaging controller 102 via interface 105b.

At step S208, the imaging controller 102 detects the orientation of the first user and the second user present in the environment of the lighting system 100 by detecting the orientation of each user's head based on the signal received via interface 105a from the sensor(s) 104. Step S208 may be implemented by means of the imaging controller 102 executing a facial recognition algorithm and/or utilizing other image recognition techniques, for example by tracking facial features of the users or by analyzing the movement of the users' limb(s).

Based on the orientation of each user's head, at step S210 the imaging controller 102 estimates a Field of View (FOV) of each user present in the environment of the lighting system 100. A FOV of a user is the area in the environment of the lighting system 100 that is visible to the user. A FOV is defined by a forward facing vertical view angle θv (shown in FIG. 3a) and a forward facing horizontal view angle θh (shown in FIG. 3b). The imaging controller 102 is preconfigured with values of the angles θv and θh. It has been found that humans have an almost 180-degree forward-facing horizontal field of view, whilst the vertical range of the field of view in humans is typically around 135-degrees. Therefore the forward facing vertical view angle θv may be set to 135 degrees, and the forward facing horizontal view angle θh may be set to 180 degrees. It will be appreciated that these values of the angles θv and θh are merely examples.

It will be appreciated that in dependence on a user's position and orientation in the environment of the lighting system 100 the first user's FOV may overlap with the second user's FOV.

At step S212, the imaging controller 102 determines that at least one light source (controllable by the lighting controller 108) is positioned to emit light in both the FOVs of the first user and the second user, using the information on the location of the light source(s) 110 in the environment of the lighting system 100 (determined at step S206) and the FOVs estimated at step S210.

At step S214 the imaging controller 102 arbitrates between the lighting preferences of the first user and the lighting preferences of the second user in order to determine light settings to be applied to the at least one light source. The term "light settings" does not exclude a single light setting being determined following the arbitration at step S214. At step S214, the imaging controller 102 takes into account the properties of the at least one light source (i.e. their capabilities) in order to ensure that the at least one light source can emit light in accordance with the determined light settings.

The arbitration performed at step S214 may be implemented in a number of ways.

In one embodiment, for a light source 110 that is positioned to emit light in both the FOVs of the first user and the second user, the imaging controller 102 is configured to perform the arbitration of step S214 based on what extent the light from the light source 110 is present in the user's FOV compared with in the further user's FOV. That is, the imaging controller 102 compares a proportion of the FOV of the first user in which the light emitted from the light source 110 is incident, and a proportion of the FOV of the second user in which the light emitted from the light source 110 is incident. The light settings to be applied to the light source 110 are based on (i) the lighting preferences of the first user if the proportion of the field of view of the first user is greater than proportion of the field of view of the second user, or (ii) the lighting preferences of the second user if the proportion of the field of view of the second user is greater than proportion of the field of view of the first user. For example if the light emitted by the light source 110 is present in 5% of the first user's FOV and 70% in the second user's FOV then the imaging controller 102 determines light settings to be applied to the light source 110 based on the lighting preferences of the second user.

In another embodiment, for a light source 110 that is positioned to emit light in both the FOVs of the first user and the second user, the imaging controller 102 is configured to perform the arbitration of step S214 based where the light effect of the light source 110 is visible in the first user's FOV compared with in the second user's FOV. That is, the imaging controller 102 compares a location in the FOV of the first user at which the light emitted from the light source 110 incident, and location in the FOV of the second user at which the light emitted from the light source incident. The light settings to be applied to the light source 110 are based on (i) the lighting preferences of the first user if the light emitted from the light source 110 is incident in the FOV of the first user in a more central location than in the field of view of the second user, or (ii) the lighting preferences of the second user if the light emitted from the light source 110 is incident in the field of view of the second user in a more central location than in the field of view of the first user. For example, if the light effect of the light source 110 is in the center of the first user's FOV but in the periphery of the second user's FOV then the imaging controller 102 determines light settings to be applied to the light source 110 based on the lighting preferences of the first user. Reference herein to the central location of a user's FOV is used to refer to an imaginary axis projecting perpendicular from a user's eye line in the direction the user is facing, thus the closer the location of the light effect of the light source 110 that is incident in the field of view of a user is to this axis the more central its location.

In other embodiments, for a light source that is positioned to emit light in both the FOVs of the first user and the second user, the imaging controller 102 is configured to perform the arbitration of step S214 based on the lighting preferences of both the user and the second user.

For example, the arbitration performed at step S214 may comprise determining an average of the lighting preferences of the first user and the lighting preferences of the second user.

The first user may prefer the color of the light emitted from the plurality of lighting devices that is incident in his FOV to have a first hue value, whereas the second user may prefer the color of the light emitted from the plurality of lighting devices that is incident in his FOV to have a second hue value, in this scenario the imaging controller 102 may determine an average hue value (a computed light setting) based on the first hue value and the second hue value. Similarly, the first user may prefer the color of the light emitted from the plurality of lighting devices that is incident in his FOV to have a color within a first hue range, whereas the second user may prefer the color of the light emitted from the plurality of lighting devices that is incident in his FOV to have a color within a second hue range, in this scenario the imaging controller 102 may determine an arbitrated hue range (a computed light setting)comprising hue values falling in both the first hue range and the second hue range.

The first user may prefer the light emitted from the plurality of lighting devices that is incident in his FOV to have a first brightness value, whereas the second user may prefer the light emitted from the plurality of lighting devices that is incident in his FOV to have a second brightness value, in this scenario the imaging controller 102 may determine an average brightness value (a computed light setting) based on the first brightness value and the second brightness value. Similarly, the first user may prefer the light emitted from the plurality of lighting devices that is incident in his FOV to have a brightness within a first brightness range, whereas the second user may prefer the light emitted from the plurality of lighting devices that is incident in his FOV to have a brightness within a second brightness range, in this scenario the imaging controller 102 may determine an arbitrated brightness range (a computed light setting) comprising brightness values falling in both the first brightness range and the second brightness range.

The brightness value can be expressed for example in terms of illuminance (in lux) i.e. in terms of the amount of light emitted from the light source(s) 110 that is incident over a plane of interest in the environment of the lighting system 100 or in terms of luminous flux (in lumens) i.e. the quantity of the energy of the light emitted from the light source(s) 110 (that emit light that is incident in the area of the environment where the FOVs of the first user and the second user overlap) per second in all directions.

In a further example, the imaging controller 102 compares the lighting preferences of the first user and the lighting preferences of the second user to determine the lowest value for each lighting preference (e.g. lowest brightness value, lowest color value) so as not to cause a disturbing effect in the FOV of either user.

In a further example, a transition profile may be assigned to the users according to the FOV of each user, the light visible in their FOV and the overlap of their FOV. Here the imaging controller 102 controls the light which is present in the shared FOV to achieve a transition between the preferences of each user such that the light present in parts of their FOV which is shared with another user transitions between the preferences of the users. The transition profile may be linear or non-linear, and conform to one of a range of functions.

In areas of the environment of the lighting system 100 where a light source 110 is positioned to emit light in only the FOV of the first user, the imaging controller 102 is configured to determine light settings to be applied to the light source 110 according to the individual lighting preferences of the first user only.

Similarly, in areas of the environment of the lighting system 100 where a light source 110 is positioned to emit light in only the FOV of the second user, the imaging controller 102 is configured to determine light settings to be applied to the light source 110 according to the individual lighting preferences of the second user only.

The spread of light from a light source may be controlled so as to control the light which is present in each user's FOV. This is especially useful in situations where light from a single light source spreads across two users FOV even though the FOV of the two users do not overlap. In such a situation the spread of a lamp may be narrowed so that it has greater influence on a single user's FOV. The spread of the light source may be controlled according to how similar the lighting preferences desired by each user are. For example, if the desired lighting preferences are the same, then the spread can be set at its maximum value. If they are different, then the spread of the light can be restricted to a specific user.

Once the light settings have been computed, the imaging controller 102 communicates the light settings to the lighting controller 108 via the interface 105c of the imaging controller 102. In response to receiving light settings from the imaging controller 102, the lighting controller 108 is configured to transmit appropriate control signals to the light source(s) 110 to apply the light settings to the light source(s) 110.

Whilst FIG. 2 has been described above with reference to only two users being present in the environment of the lighting system 100 for reasons of clarity, it will be appreciated that many more users may be present in the environment of the lighting system 100 (for example in an office) however principles described above extend to these scenarios.

Note that all these steps described above with reference to FIG. 2 do not necessarily have to be performed in the order in which they are listed above (though that is one possible embodiment).

Figure 4:
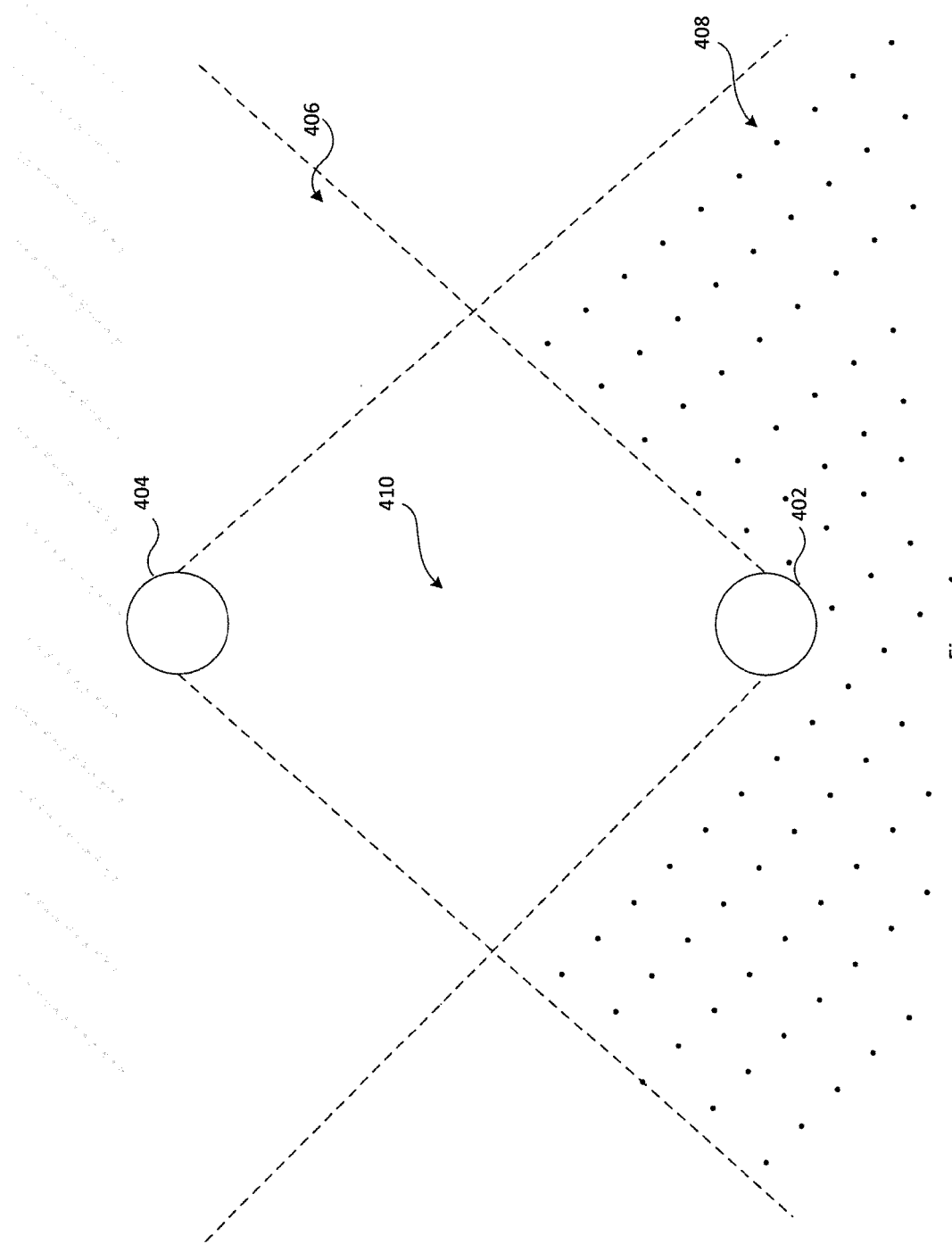
FIG. 4 illustrates the field of views of user in an environment of the lighting system.

FIG. 4 illustrates a FOV of a first user 402 and a FOV of a second user 404. As shown in FIG. 4, the first user 402 is sitting opposite to, and facing, the second user 404 in the environment of the lighting system 100.

In an area 406 of the environment of the lighting system 100 where the FOV of the first user 402 is not overlapped by the FOV of the second user 404, the imaging controller 102 is configured to determine light settings for light emitted by the light source(s) 110 that is incident in the area 406 of the environment of the lighting system 100 in the FOV of the first user 402 only, according to the individual lighting preferences of the first user 402.

In an area 408 of the environment of the lighting system 100 where the FOV of the second user 404 is not overlapped by the FOV of the first user 402, the imaging controller 102 is configured to determine light settings for light emitted by the light source(s) 110 that is incident in the area 408 of the environment of the lighting system 100 in the FOV of the second user 404 only, according to the individual lighting preferences of the second user.

Area 410 of the environment of the lighting system 100 is where the FOV of the first user 402 overlaps with the FOV of the second user 404. As a result of steps S212 and S214 being performed by the imaging controller 102, the imaging controller 102 identifies each of the light sources that are positioned such that they emit light into the area 410 and arbitrates between the lighting preferences of the first user 402 and the second user 404 in order to determine light settings for each of these identified light sources.

The steps described above with reference to FIG. 2 may be iterated periodically on a time driven basis, or may be iterated on an event driven basis.

For example, the steps of FIG. 2 may be iterated based on the image controller detecting a gesture performed by a user in the environment of the lighting system 100. In these embodiments, the imaging controller is configured to detect a gesture performed by a user based on the signal received from the sensor(s) 104.

A gesture is an action performed explicitly by a human user for the purpose of signaling an intention to control some system or apparatus. Further, the term "gesture" as used herein refers to motion of at least one bodily member through the air (or other fluid medium of the space the user is occupying, e.g. water). As such it excludes an action detected purely by detecting the bodily member in question being pressed or held against a button or a control surface such as a touch screen, pressure pad or track pad (whether directly or indirectly via an implement such as a stylus). It also excludes detection purely based on moving a sensing device over a surface while in contact with that surface, e.g. a mouse. Rather, detecting a gesture means detecting the motion of the user by means of a contactless or non-tactile sensing principle.

A gesture may be an explicit gesture such as a user raising or lowering their hand or a non-explicit gesture such as the user walking, reading, writing or operating a personal computer.

As part of the registration process described above a user may associate lighting preferences with one or more gesture. Information on a user's gestures and associated lighting preferences are stored in memory 106. For example, a user may specify that when the user raises a hand, light sources which emit light in his field of view are to be dimmed up in proportion to a magnitude of the gesture .g. how far is the hand raised. Similarly, a user may specify that when the user raises a hand, light sources which emit light in his field of view are to be dimmed down in proportion to a magnitude of the gesture .g. how far is the hand lowered. Note that "proportional" as used herein does not necessarily mean proportional in the strict mathematical sense, i.e. not necessarily a linear relationship between any two quantities such as intensity and the distance a hand is moved (though such a relationship is one possibility).

The image controller 102 is configured to detect a gesture performed by a user based on the signal received via interface 105a from the sensor(s) 104, and retrieve lighting preferences of the user associated with the detected gesture from memory 106 at step S204.

Thus in accordance with embodiments described above, When a user makes a gesture to control the light source(s) 110, the effect of the requested change on other users in the environment of the lighting system 100 is calculated according to (i) the orientation of other users present in the environment of the lighting system 100 and (ii) the preferences of other users present in the environment of the lighting system 100. The requested lighting change is arbitrated by scaling it according to the effect the requested change in lighting has on other users, based on the orientation and preferences of the users present in the environment of the lighting system 100.

Consider a scenario where three users (User A, User B and User C) are present in a room in which the light source(s) 110 are located. User B is facing in the opposite direction to User A, and hence is observing a different scene to that of User A. User C is facing at right angles to User A and User B, and thus observes a scene which shares some of the properties of the scenes observed by User A and User B.

In this scenario if User A makes a gesture to increase the lighting intensity. It is detected that User B will be unaffected by this change, whilst User C will be partially affected. In accordance with the embodiments described above, if it is detected that User C has similar lighting preferences to User A, the lighting intensity in the FOV of User A is changed as requested by User A. However if it is detected that User C has different lighting preferences to User A, then the change requested by User A is scaled accordingly based on the lighting preferences of User A and User C.

It will be apparent that embodiments described herein are advantageous in that the arbitration performed by the imaging controller 102 considers each of the users' dynamically changing orientation, whilst light emitted by a light source into an area of the environment in the field of view of a single user is not affected by the lighting preferences of other users who cannot see the area visible by the single user.

It will be appreciated that the above embodiments have been described only by way of example. While embodiments have been illustrated and described in detail in the drawings and foregoing description, such illustration and description are to be considered illustrative or exemplary and not restrictive, and the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller comprising:
   an output for controlling one or more light source arranged to emit light to illuminate an environment; and
   an input for receiving a signal output from at least one sensor;
   wherein the controller is configured to:
   identify presence of a user and at least one further user in said environment based on the signal output from the at least one sensor;
   determine lighting preferences of the user and the at least one further user;
   detect an orientation of the user and the at least one further user based on the signal output from the at least one sensor;
   estimate a field of view of the user and the at least one further user based on the detected orientation of the user and the at least one further user;
   determine that at least one light source of the one or more light source is positioned to emit light in both the field of view of said user and the field of view of said at least one further user, arbitrate between the lighting preferences of the user and the at least one further user to determine light settings to be applied to the at least one light source, and control said at least one light source based on the determined light settings,
   wherein the controller is configured to perform said arbitration based on a comparison of a proportion of, or a location in, the field of view of the user in or at which the light emitted from the at least one light source is incident, and a proportion of, or a location in, the field of view of the at least one further user in or at which the light emitted from the at least one light source is incident.

2. The controller according to claim 1, wherein
   the determined light settings are based on (i) the lighting preferences of the user if the proportion of the field of view of the user is greater than proportion of the field of view of the at least one further user, or (ii) the lighting preferences of the at least one further user if the proportion of the field of view of the at least one further user is greater than proportion of the field of view of the user.

3. The controller according to claim 1, wherein
   the determined light settings are based on (i) the lighting preferences of the user if the light emitted from the light source is incident in the field of view of the user in a more central location than in the field of view of the at least one further user, or (ii) the lighting preferences of the least one further user if the light emitted from the light source is incident in the field of view of the least one further user in a more central location than in the field of view of the user.

4. The controller according to claim 1, wherein the light settings to be applied to the at least one light source are determined based on the lighting preferences of the user and the at least one further user.

5. The controller according to claim 4, wherein the light settings to be applied to the at least one light source are determined based on an average of the lighting preferences of the user and the at least one further user.

6. The controller according to claim 1, the controller further comprising an input for receiving location information of the one or more light source from a memory, wherein the controller is configured to determine that said at least one light source is positioned to emit light in both the field of view of said user and the field of view of said at least one further user based on said location information.

7. The controller according to claim 1, wherein the controller is configured to determine said light settings based on properties of the at least one light source.

8. The controller according to claim 7, wherein the properties of the at least one light source comprise one or any combination of: a light source type of the at least one light source, an available color range of light emitted from the at least one light source, an available brightness range of light emitted from the at least one light source, and an available beam spread range of light output from the at least one light source.

9. The controller according to claim 1, wherein the controller is further configured to control said at least one light source by transmitting said determined light settings to a lighting controller, the lighting controller configured to control said at least one light source based on received light settings.

10. The controller according to claim 1, wherein the controller is configured to:
    capture biometric information of the user based on the signal output from the at least one sensor, and
    determine if the captured biometric information corresponds to biometric information stored in a memory coupled to the controller;
    wherein if the captured biometric information corresponds to biometric information stored in said memory, the controller further configured to retrieve lighting preferences associated with the biometric information stored in said memory to determine lighting preferences of the user;

wherein if the captured biometric information does not correspond to biometric information stored in said memory, the controller further configured to retrieve default lighting preferences stored in said memory to determine lighting preferences of the user.

11. The controller according to claim 1, wherein the controller is configured to:

capture biometric information of the at least one further user based on the signal output from the at least one sensor, and determine if the captured biometric information corresponds to biometric information stored in a memory coupled to the controller;

wherein if the captured biometric information corresponds to biometric information stored in said memory, the controller further configured to retrieve lighting preferences associated with the biometric information stored in said memory to determine lighting preferences of the at least one further user;

wherein if the captured biometric information does not correspond to biometric information stored in said memory, the controller further configured to retrieve default lighting preferences stored in said memory to determine lighting preferences of the at least one further user.

12. The controller according to claim 1, wherein the lighting preferences of the user comprise one or any combination of the user's preferred lighting brightness, lighting color, spread of light incident in the user's field of view, and light source type; and the lighting preferences of the at least one further user comprise one or any combination of the at least one further user's preferred lighting brightness, lighting color, spread of light incident in the at least one further user's field of view, and light source type.

13. The controller according to claim 1, wherein the controller is configured to execute an image recognition algorithm to detect an orientation of the user's head to detect the orientation of the user and to detect an orientation of the least one further user's head to detect the orientation of the least one further user.

14. A lighting system comprising the controller of claim 1, the one or more light source, and the at least one sensor.

15. A computer program product for performing sensing using a signal output from at least one sensor to control one or more lighting source to illuminate an environment, the computer program product comprising code embodied on a non-transitory computer-readable medium and configured so as when executed on one or more processing units to perform operations of:

identifying presence of a user and at least one further user in said environment based on the signal output from the at least one sensor;

determining lighting preferences of the user and the at least one further user;

detecting an orientation of the user and the at least one further user based on the signal output from the at least one sensor;

estimating a field of view of the user and the at least one further user based on the detected orientation of the user and the at least one further user;

determining that at least one light source of the one or more light source is positioned to emit light in both the field of view of said user and the field of view of said at least one further user, arbitrating between the lighting preferences of the user and the at least one further user to determine light settings to be applied to the at least one light source, and controlling said at least one light source based on the determined light settings, wherein the arbitration is based on a comparison of a proportion of, or a location in, the field of view of the user in or at which the light emitted from the at least one light source is incident, and a proportion of, or a location in, the field of view of the at least one further user in or at which the light emitted from the at least one light source is incident.

* * * * *